(12) United States Patent
Baker

(10) Patent No.: US 11,958,281 B2
(45) Date of Patent: Apr. 16, 2024

(54) REMOVAL TOOL FOR FLOORING PLANKS

(71) Applicant: TSC International Products, LLC, Chatsworth, GA (US)

(72) Inventor: Adam Baker, Calhoun, GA (US)

(73) Assignee: TSC International Products, LLC, Chatsworth, GA (US)

( * ) Notice: Subject to any disclaimer, the term of this patent is extended or adjusted under 35 U.S.C. 154(b) by 0 days.

(21) Appl. No.: 17/446,843

(22) Filed: Sep. 3, 2021

(65) Prior Publication Data
US 2023/0076133 A1    Mar. 9, 2023

(51) Int. Cl.
| | | |
|---|---|---|
| *B32B 43/00* | (2006.01) |
| *E04F 11/16* | (2006.01) |
| *E04F 11/17* | (2006.01) |
| *E04F 19/06* | (2006.01) |
| *E04F 21/00* | (2006.01) |

(52) U.S. Cl.
CPC .......... *B32B 43/006* (2013.01); *E04F 11/166* (2013.01); *E04F 11/175* (2013.01); *E04F 19/06* (2013.01); *E04F 21/00* (2013.01); *B32B 2419/04* (2013.01); *Y10T 156/1174* (2015.01); *Y10T 156/195* (2015.01)

(58) Field of Classification Search
CPC ............. B32B 43/006; Y10T 156/1174; Y10T 156/195
See application file for complete search history.

(56) References Cited

U.S. PATENT DOCUMENTS

| | | | |
|---|---|---|---|
| 2,655,976 A | 10/1953 | Lovin | |
| 5,878,973 A * | 3/1999 | Mizukoshi | ............ B32B 43/006 708/711 |
| 5,891,297 A * | 4/1999 | Stadtmueller | ....... B29C 63/0013 156/763 |
| 6,170,361 B1 | 1/2001 | Yates | |
| 6,199,616 B1 | 3/2001 | Gillespie | |

(Continued)

FOREIGN PATENT DOCUMENTS

DE        3002831 A1    7/1981

OTHER PUBLICATIONS

International Search Report dated Mar. 9, 2023 issued in connection with International Application No. PCT/US22/75557 (2 pages total).

(Continued)

*Primary Examiner* — Philip C Tucker
*Assistant Examiner* — Nickolas R Harm
(74) *Attorney, Agent, or Firm* — Tatonetti IP

(57) ABSTRACT

A decorative layer removal tool for flooring is configured with a removal shaft and either a drill attachment or handle to remove the decorative layer from a plank. The removal shaft includes a threaded end to attach to either the handle or drill attachment. The handle can be used when the user wishes to manually rotate the shaft and remove the decorative layer; the drill attachment can be used with a power drill for a motorized removal. The removal shaft includes a slit that extends from an unthreaded end to the threaded side. In typical implementations, the slit may not extend to the shaft's threads. At least a portion of the slit is used to receive the decorative surface layer from a plank, thereby enabling the decorative layer's removal.

8 Claims, 13 Drawing Sheets

(56) References Cited

U.S. PATENT DOCUMENTS

| | | | | |
|---|---|---|---|---|
| 6,221,199 | B1* | 4/2001 | Chang | B24B 37/20 |
| | | | | 156/759 |
| 6,227,479 | B1* | 5/2001 | Dean | B65H 75/406 |
| | | | | 156/763 |
| 7,125,326 | B2* | 10/2006 | Walsh | B24B 37/34 |
| | | | | 451/526 |
| 10,611,599 | B1 | 4/2020 | Staley et al. | |
| 2003/0188833 | A1* | 10/2003 | Adleman, Jr. | E04G 23/006 |
| | | | | 156/763 |
| 2004/0016844 | A1 | 1/2004 | Felts et al. | |
| 2006/0090847 | A1* | 5/2006 | peirce | B65H 75/24 |
| | | | | 156/764 |
| 2007/0163062 | A1* | 7/2007 | McKay | A47L 25/005 |
| | | | | 15/230.11 |
| 2008/0236743 | A1* | 10/2008 | Kye | B29C 63/0013 |
| | | | | 156/759 |
| 2012/0318464 | A1 | 12/2012 | Kron et al. | |
| 2015/0309341 | A1* | 10/2015 | Zhang | G02F 1/1309 |
| | | | | 445/2 |
| 2018/0009081 | A1* | 1/2018 | Sotozaki | H01L 21/304 |
| 2018/0141202 | A1* | 5/2018 | Newman | B25G 3/26 |
| 2019/0208963 | A1* | 7/2019 | Ma | A47J 43/04 |

OTHER PUBLICATIONS

Written Opinion of the International Searching Authority dated Mar. 9, 2023 issued in connection with International Application No. PCT/US22/75557 (7 pages total).

\* cited by examiner

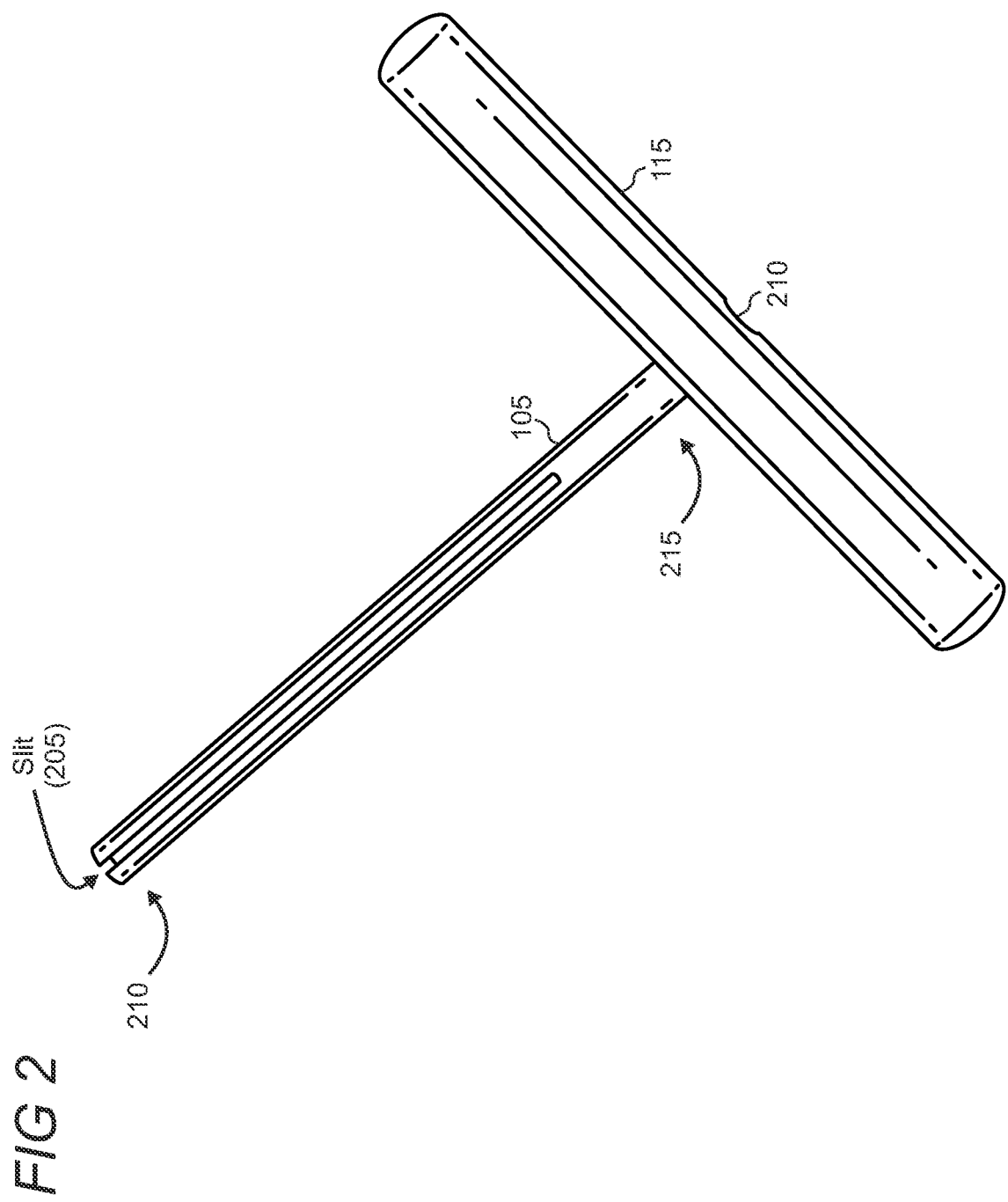

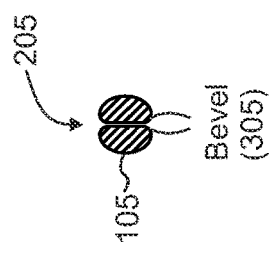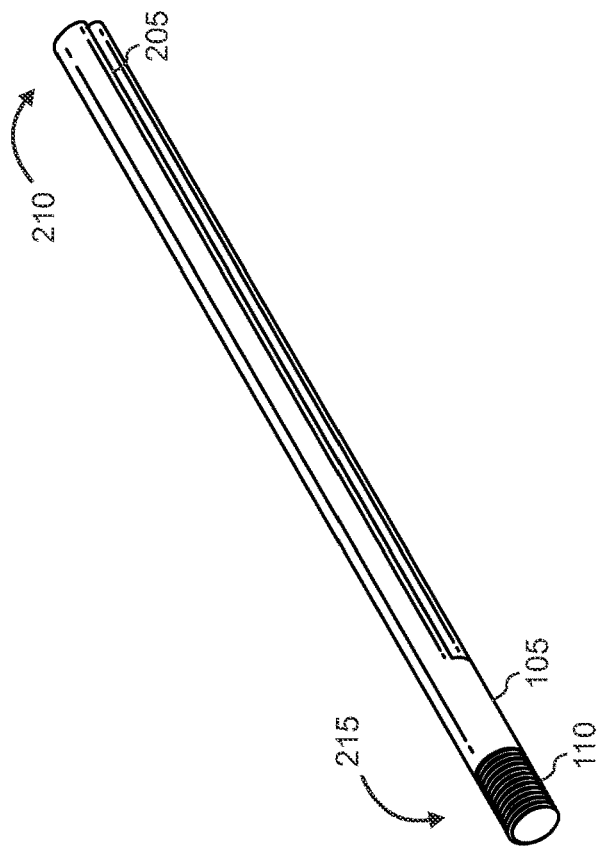

REMOVAL TOOL FOR FLOORING PLANKS

BACKGROUND

Flooring tends to have transitional areas, such as under a door and between two rooms, at the bottom or top of a staircase, among other areas. Flooring accessory items can include stair nosing, stair tread, floor vent covers, molding, or other transitional areas. Typically, these transitional areas utilize a pre-applied decorative surface wear layer that is not an aesthetic match to the vinyl plank or tile that a contractor or homeowner is installing.

A pre-applied decorative surface wear layer on the accessory items does not match the installed flooring for several reasons, including differences in the wear layer's thickness, the textures, the colors, and the clear coat finishes. Thus, various technical details that the building owner, homeowner, or designer used in selecting the new flooring can differ regarding accessory items. Typically, this results because the flooring manufacturer does not produce the accessory items for the planks, tiles, or other floorings, but instead, they are produced by third-party manufacturers using different raw materials.

Even if the flooring manufacturer produces an accessory item, the decorative surface wear layer is typically still not an exact match because of production variations between production lots. Meaning, the decorated surface wear layer was produced in a separate production plant from the flooring material, which results in a different production lot number and ultimately different designs.

SUMMARY

A flooring accessory item, such as a transition, stair nosing, stair tread, floor vent cover, molding, or other accessories, is configured with an outer dry adhesive film layer to which a decorative surface skin layer can attach. The outer adhesive film layer is utilized to receive and secure a decorative layer for exposure at a later date. In some implementations, the film layer may be covered with a protective release paper to protect or preserve the outer adhesive, depending on the adhesive film type. The adhesive film layer can consist of a single layer of a dry adhesive film without a carrier, such as an internal scrim. Alternatively, the adhesive film layer may include a scrim-reinforced adhesive film, a woven fabric, foil carrier coated on both sides with an adhesive film, or an adhesive component that is chemically, thermally, or electronically (radio wave) activated at the installation site.

Placing a pre-applied exterior dry adhesive film layer onto these flooring accessory items, such as a transition, stair nosing, stair tread, floor vent, molding, or other items, results in a "blank" item that can be quickly and readily customized. For example, a decorative surface layer can be pulled from a vinyl plank or tile installed at the installation site and attached to the accessory item's adhesive film layer. Since the accessory item is customized using the main flooring design, the accessory item is practically an exact and corresponding match to the remainder of the floor. The vinyl plank or tile's design can be pulled from leftover scrap flooring or full pieces of flooring.

The decorative surface wear layer from the vinyl plank or tile installed can be intentionally delaminated or separated from its original backing material. The delaminated or separated decorative surface wear layer is then wrapped around and secured to the "blank" accessory item using its outer dry adhesive film layer. This results in the transition, stair nosing, stair tread, floor vent, molding, or other accessory having a practically perfect match to the newly installed flooring, including the same production lot number.

A decorative layer removal tool for flooring is configured with a removal shaft and either a drill attachment or handle to remove the decorative layer from a plank. The removal shaft includes a threaded end to attach to either the handle or drill attachment. The handle can be used when the user wishes to manually rotate the shaft and remove the decorative layer; the drill attachment can be used with a power drill for a motorized removal.

The removal shaft includes a slit that extends from an unthreaded end to the threaded side. In typical implementations, the slit may not reach the shaft's threads. At least a portion of the slit is used to receive the decorative surface layer from a plank, thereby enabling the decorative layer's removal. The handle is a linear component, such as a cylindrical shaft, that includes a threaded bore to which the threads of the removal shaft fasten. When the handle is fastened to the removal shaft, the user can rotate the handle to cause the decorative surface layer to translatably rotate and wrap around the removal shaft.

The drill attachment includes a threaded hole on a removable shaft end and a protruding shaft on a drill end. The removable shaft end is the end that attaches to the removable shaft, and the drill end is the end to which the power drill's chuck attaches. Once the drill is attached to the drill end of the drill attachment, the drill's rotation translates to the removal shaft's rotation to thereby incrementally remove the decorative layer.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. These and various other features will be apparent from a reading of the following Detailed Description and a review of the associated drawings.

BRIEF DESCRIPTION OF THE DRAWINGS

FIG. 2 shows an illustrative representation of a slit in the removal tool;

FIGS. 3A and 3B show illustrative representations of the removal tool;

Like reference numerals indicate like elements in the drawings. Elements are not drawn to scale unless otherwise indicated.

DETAILED DESCRIPTION

Figure 1:
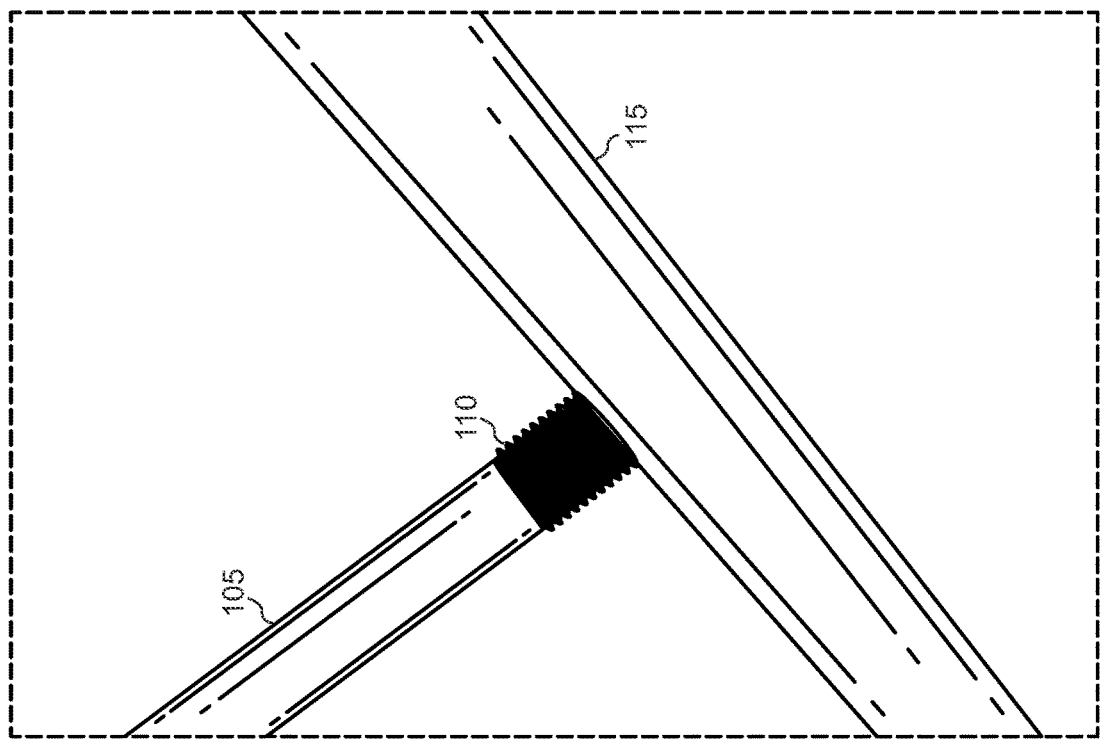
FIG. 1 shows an illustrative representation of a removal shaft attached to a handle.

FIGS. 1 and 2 show illustrative representations of a removal shaft 105 connected to a handle 115. The removal shaft includes threads 110 on its end to removably attach to a driver, such as a handle. Once connected, the handle is used to translatably rotate the removal tool, as discussed in greater detail below.

As shown in FIG. 2, the removal shaft includes a slit 205 that extends along a longitudinal axis of the removal shaft. In typical implementations, the slit begins at a slit end 210 of the removal shaft opposite the threaded end 215 (FIG. 1). The slit may extend toward a side of the threaded end so that, as discussed in greater detail below, a greater portion of a decorative layer from a plank can insert into the slit to initiate the removal process. The slit may extend, for example, somewhere between 50-90% across the removal shaft or may extend up to or adjacent to the threads 110. In other implementations, the slit may begin before the end of the removal shaft, that is, somewhere between the ends. Furthermore, while the slit may extend across 50-90% across the removal shaft's body, in other implementations, the slit may extend across 10-90% of the removal shaft's body. The length of the slit may depend, for example, on the specific use scenario.

The removal shaft may be, for example, approximately 407 mm in length, the slit may be 330 mm in length, and the threaded region may be 30 mm in length. The width of the slit may be 1.5 mm in length, and the diameter of the removal shaft may be 30 mm. All sizes discussed herein with respect to the various components are exemplary only to provide a frame of reference. The same features, configurations, and structures discussed herein may be implemented according to larger or smaller measurements, and thus, the sizes discussed herein should not be construed as limiting.

FIGS. 3A and 3B show illustrative representations of the removal shaft 105 from distinct angles. FIG. 3A shows a perspective view of the removal shaft alone and the overall orientation and configuration of the shaft's slit 205 and threads 110. FIG. 3B shows a cross-sectional view of the removal shaft, in which ends of the slit form a bevel 305 to aid the user in securing the decorative layer into the slit, as discussed in greater detail below. The bevel may be about 1.5 mm toward the slit.

Figure 4A:
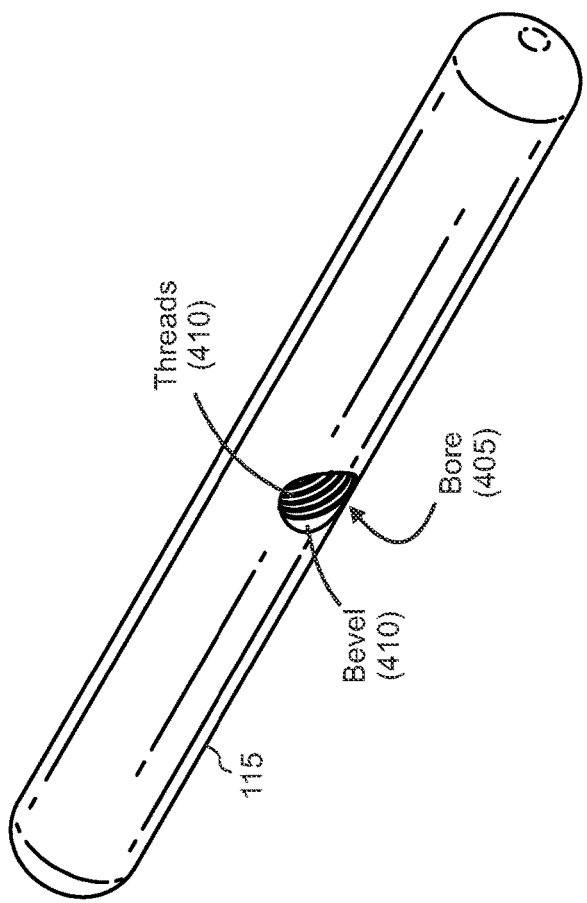
FIGS. 4A and 4B show illustrative representations of the handle.
Figure 4B:
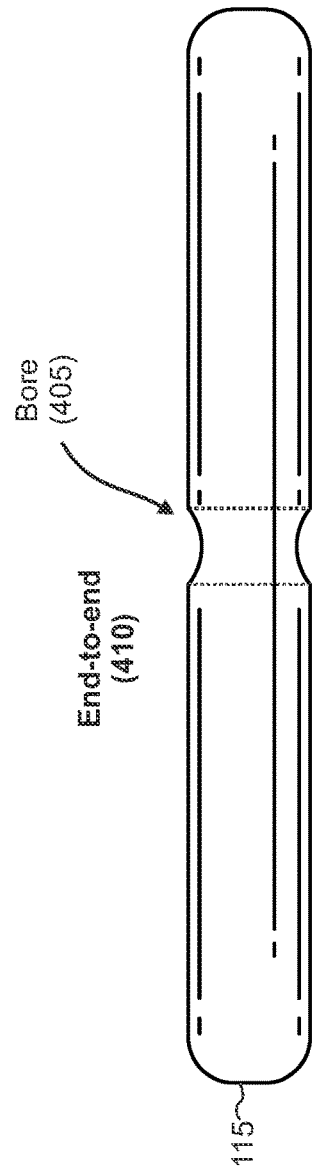

FIGS. 4A and 4B show illustrative representations of the handle 115, which functions as a driver. Specifically, when the handle is attached to the removal shaft, the user can rotate the handle clockwise or counterclockwise, which translates to the removal shaft. Such rotation at the removal shaft enables the incremental removal of a decorative layer on a plank. The handle may have a diameter of 30 mm and a length of about 281 mm.

The handle 115 includes a bore 405 at a longitudinal center thereof. The bore includes corresponding threads 410 that engage with the male connector threads on the removal shaft 105. In this scenario, the handle is perpendicular to the longitudinal axis of the removal shaft. The bore in the handle extends from end-to-end, as representatively shown by the broken lines in FIG. 4B, to form a hole within the handle. The length of the bore, and thereby the handle, is the same or substantially the same as the length of the threaded region on the removal shaft. Thus, there may be no remaining exposed threads on the removal shaft when the handle is fully engaged with the removal shaft. Likewise, the threaded end 215 of the removal shaft may be aligned or substantially aligned with the distal surface of the handle. The bore's left and right sides, on each end of the slit, include bevels 410 to enable easier insertion of the removal shaft into the bore.

FIGS. 5A-D show illustrative representations of a drill attachment 505, which functions as an alternative driver to the handle. The drill attachment is adapted to removably engage with the removal shaft's threads and includes a bit 525, which can attach to a drill's chuck. The drill attachment includes a main body 510, which includes a hole 520 having threads 530 that engages with the removal shaft's threads. Surrounding the threaded hole is a flat surface 515. Like the handle, the length of the drill attachment's threads and the hole may be the same or substantially the same as the length of the threaded region on the removal shaft.

Figure 5C:
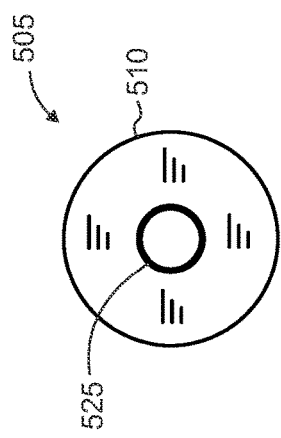
FIGS. 5A-D show illustrative representations of a drill attachment.
Figure 5D:
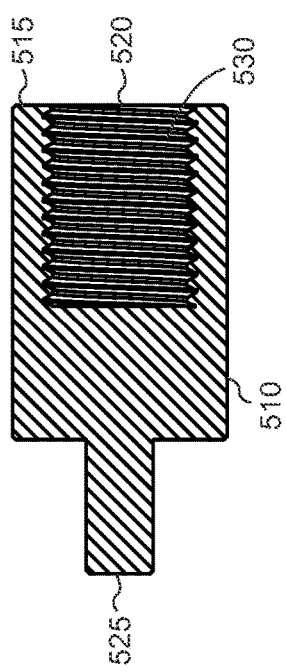
Figure 5A:
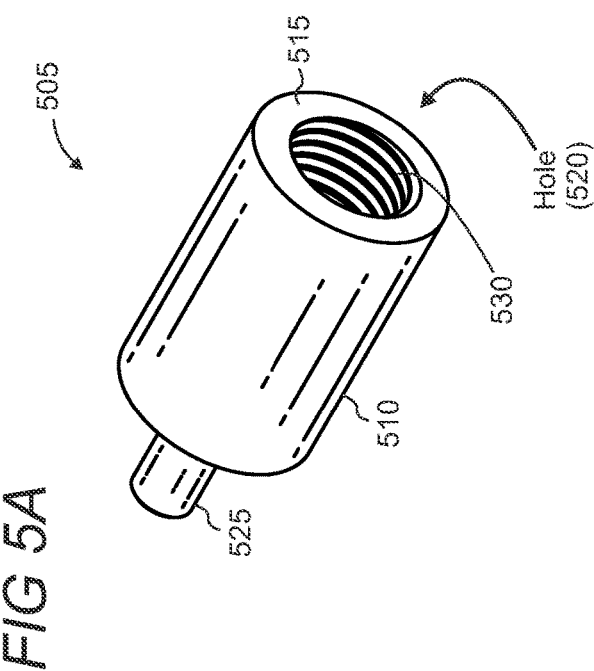
Figure 5B:
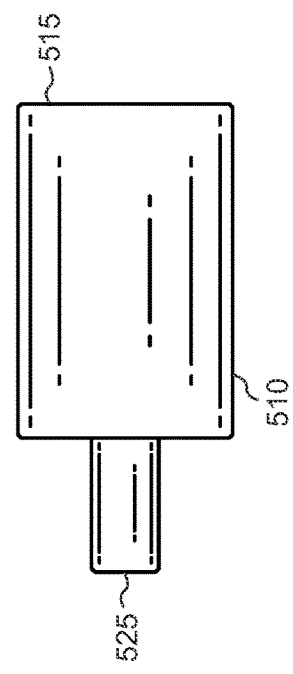

As shown in FIG. 5C, bit 525 is centered on the side of the main body 510 opposite the hole 520. The bit is centered on enabling rotational movement of the drill attachment 505 when attached to a power drill. As shown in the cross-sectional view of FIG. 5D, the threaded region of the drill attachment extends partially through the main body. The bit may be formed of one piece with the main body or attached to, such as welded, to the main body. The drill attachment may have a total length of about 70 mm, the bit having a length of 20 mm and a diameter of 10 mm, the main body's length being 50 mm, and a diameter of the main body being 32 mm, and an internal depth of the hole is about 30 mm.

Figure 5E:
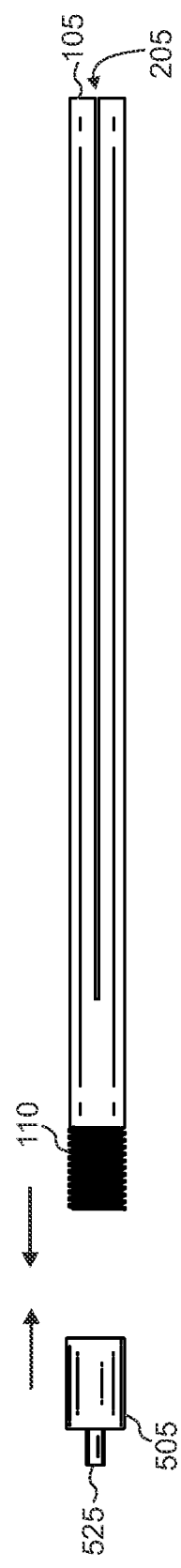
FIGS. 5E and 5F show illustrative representations of the drill attachment connecting to the removal shaft.
Figure 5F:
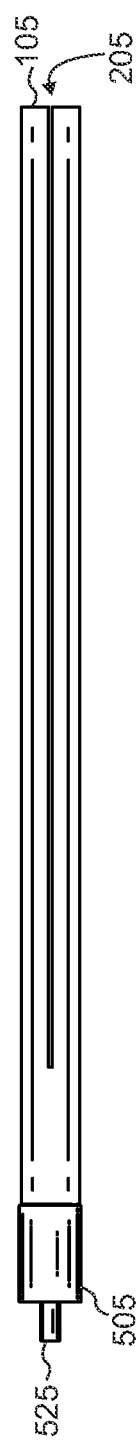

FIGS. 5E and 5F show illustrative representations in which the drill attachment 505 is aligned with and attaches to the removal shaft 105. In FIG. 5E, the drill attachment's hole 520 is aligned with the threads 110 of the removal shaft. In FIG. 5F, the drill attachment 505 is fully engaged with the removal shaft's threads. In this scenario, the drill attachment and removal shaft are aligned such that the longitudinal axes of each component are parallel. The user can then secure the bit 525 to a drill's chuck. When attached to the drill, the motorized rotational movement translates such rotational movement to the removal shaft.

Figure 6:
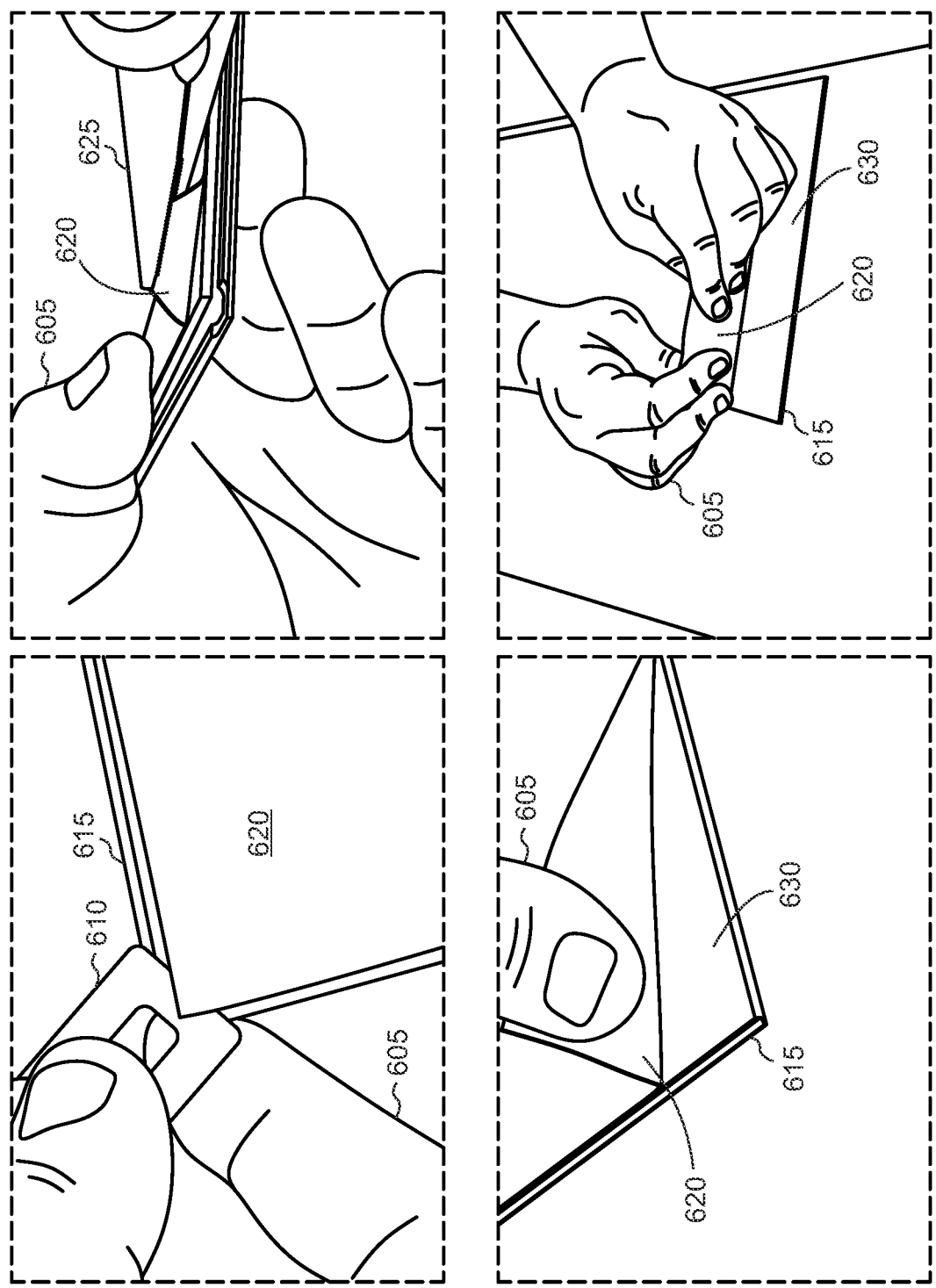
FIG. 6 shows illustrative representations of a user removing a decorative layer from a plank.
Figure 7:
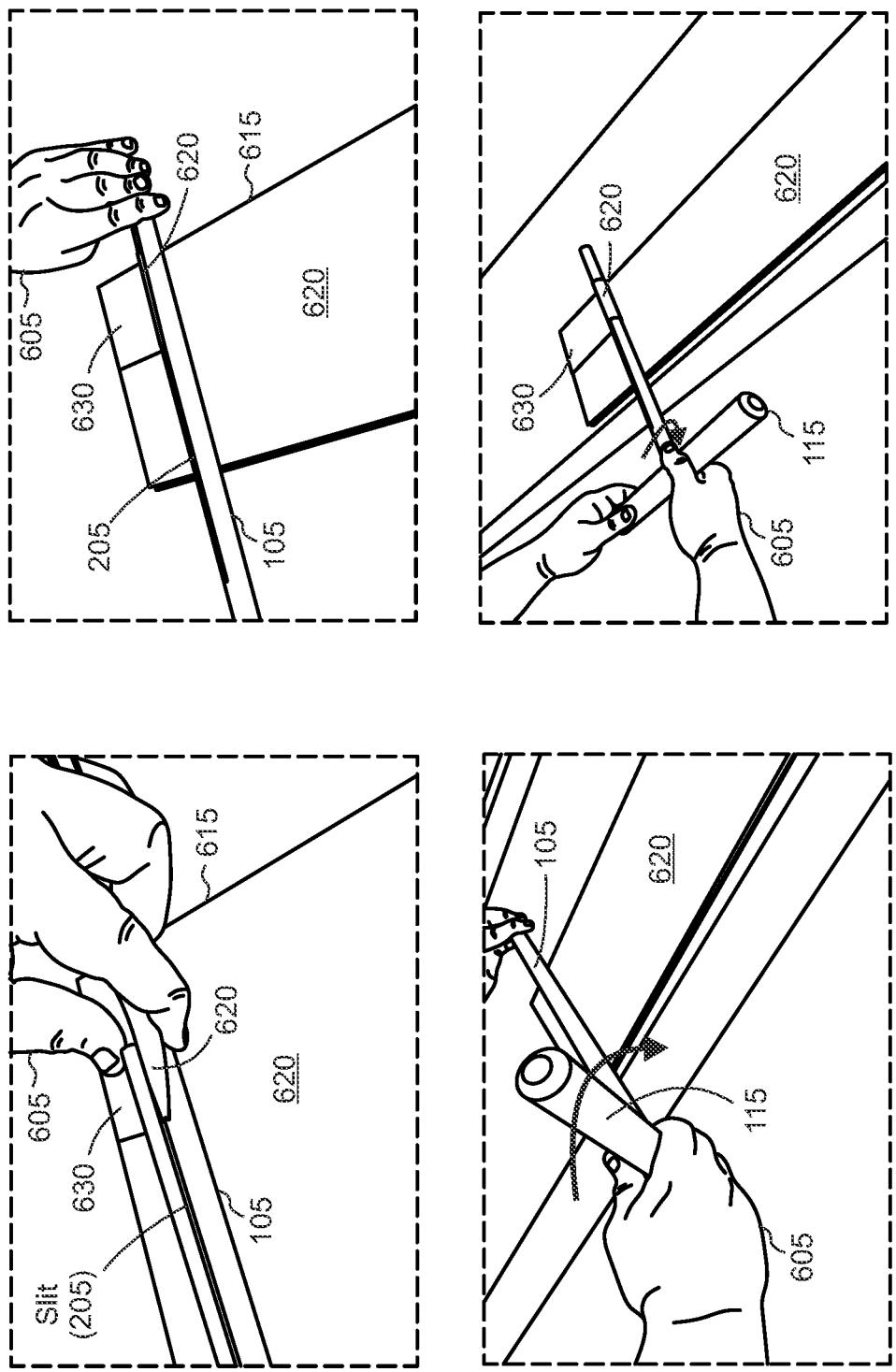
FIG. 7 shows illustrative representations of the removal shaft with the handle being used to remove the decorative layer.
Figure 8:
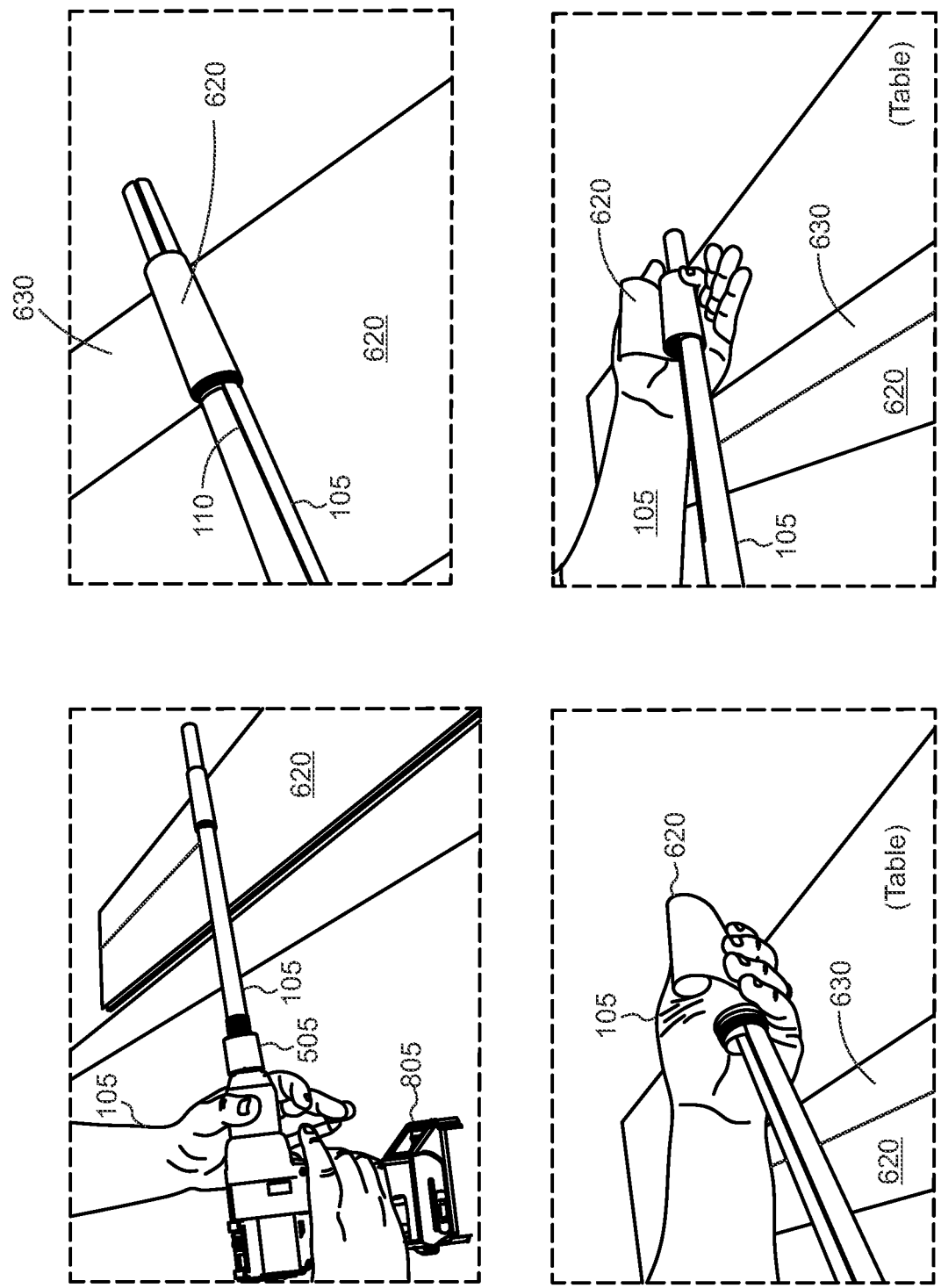
FIG. 8 shows illustrative representations of the removal shaft with drill attachment being used to remove the decorative layer.

FIGS. 6-8 show illustrative representations in which the removal tool is used to remove a decorative layer from a plank. While the removal tool can be used to remove an entire width of the decorative layer from its plank, in this example, the user removes a portion of the decorative layer from the plank.

In FIG. 6, user 605 attempts to initiate the removal of a decorative layer 620 from a plank 615. For example, the user uses a razor blade 610 and pliers 625 to lift a corner and end of the plank's decorative layer. Typically, decorative layers may be glued to the plank. Lifting the decorative layer upward exposes a bare surface 630 of the plank 615.

In FIG. 7, The user incorporates the removal tool to lift the remaining decorative layer 620 from plank 615. The user inserts an end portion of the decorative layer into the removal shaft's slit 205 to secure the decorative layer to the tool. The decorative layer may extend from one end of the slit through to the other end of the slit to sufficiently latch the layer in place. The user can then begin rotating the removal tool, such as using the handle 115, which causes the removal shaft to rotate translatably. For example, clockwise rotation of the removal tool causes the decorative layer, which has been secured through the slit, to wrap around the rotating removal shaft. As shown, the bare surface 630 is exposed as the decorative layer 620 continues to wrap around the removal shaft.

In FIG. 8, the user uses the drill attachment 505 as the driver to rotate the removal shaft. Specifically, once the bit 525 is attached to the drill's chuck, drill 805 causes a clockwise rotation which translates to the removal shaft and the secured decorative layer continuing to wrap around the shaft.

The user may continue rotation of the removal tool until the length of the decorative layer is removed or up until a pre-measured point. Likewise, the width of the decorative layer may depend on the user's pre-measurements of, for example, an accessory item to which the user wishes to attach the decorative layer. The user can continue to remove additional pieces of the decorative layer from the plank as needed using the steps described above and shown in FIGS. 6-8.

Figure 9:
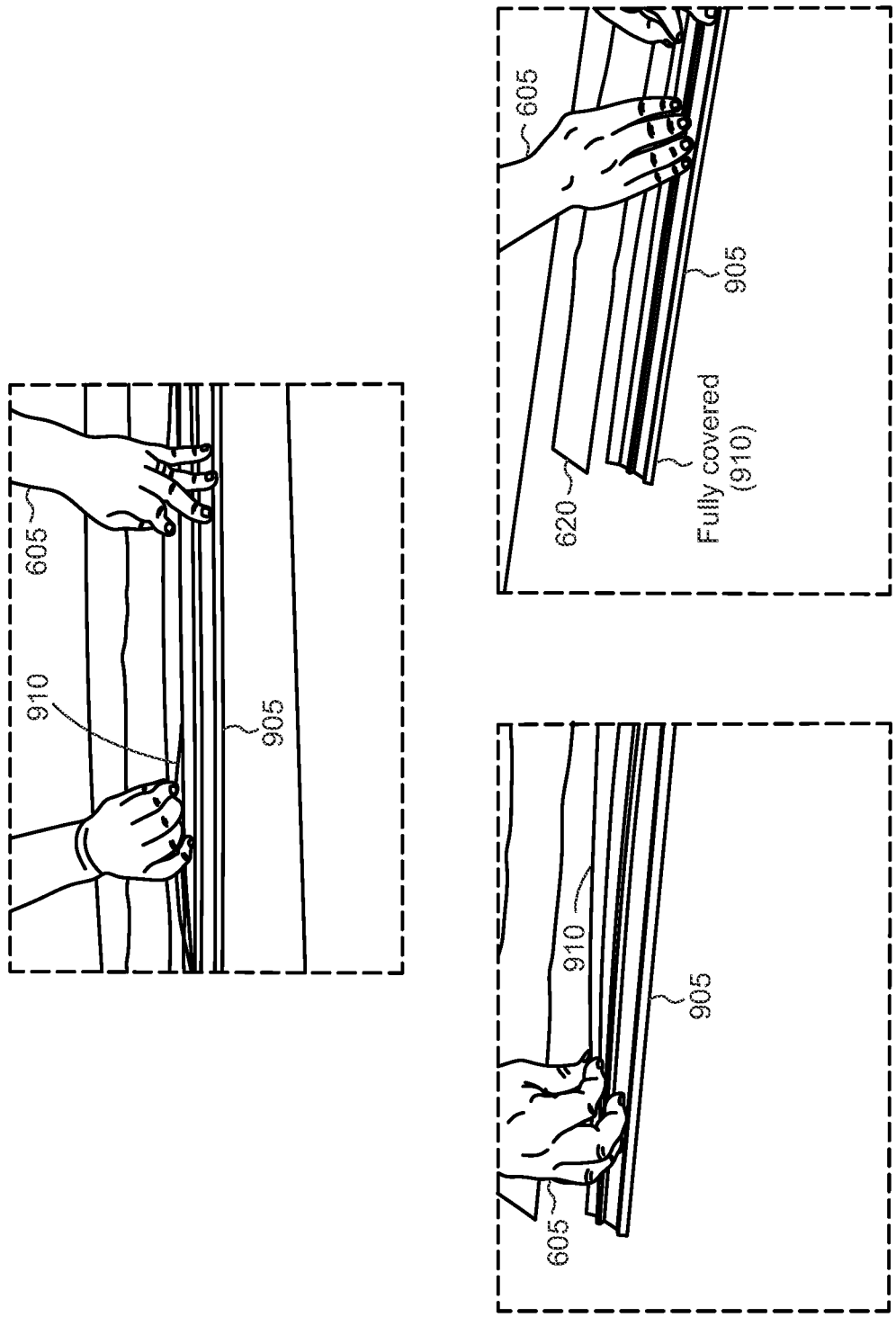
FIG. 9 shows an illustrative representation of an adhesive film layer applied to an accessory item.

FIG. 9 shows an illustrative representation in which the user attaches a dry adhesive film layer 910 to a piece of transitional flooring 905. Although transitional flooring is shown in FIG. 9, the discussion herein applies to other accessory items. Typically, transitional flooring comes pre-made with a "look-alike" decorative layer. This decorative layer may be similar to the remainder of the user's flooring but is often off-base and not a perfect match or even an aesthetically pleasing match. In that regard, the user applies a two-sided adhesive film layer that attaches to the transitional flooring base surface. The user ensures that the exposed surfaces of the transitional flooring piece are covered. An area of the transitional flooring that may not be covered with the adhesive film is the connecting piece that connects to the floor.

Figure 10:
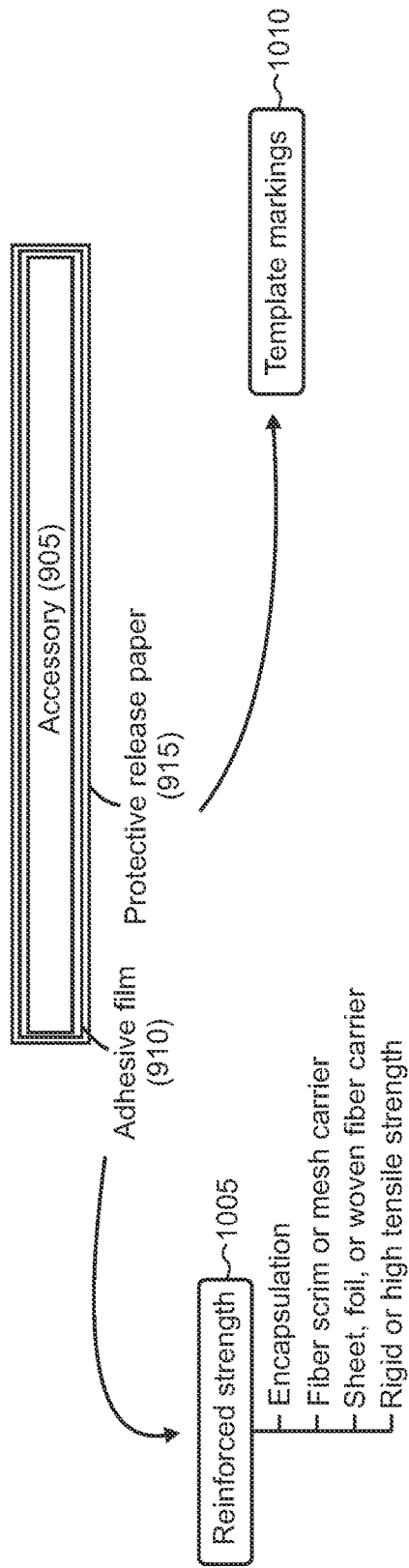
FIG. 10 shows an illustrative representation of the layers associated with a pre-made accessory item.
Figure 11:
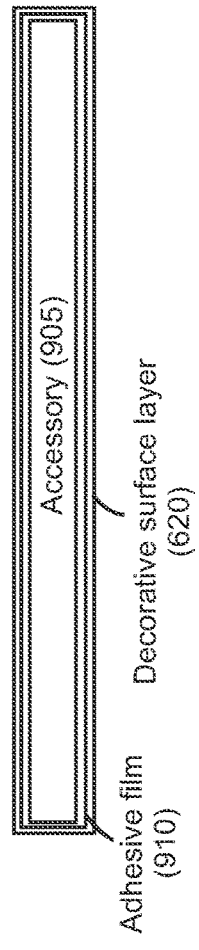
FIG. 11 shows an illustrative representation of the layers associated with a used accessory item.

FIGS. 10 and 11 show illustrative representations in which the layers of an accessory item 905 are shown. In FIG. 10, a pre-made accessory item can include an adhesive film 910 attached directly to the accessory item's bare surface. A protective release paper 915 may be wrapped and packaged around the accessory item to protect the strength of the outer adhesive film. In other implementations, the pre-made accessory item may be sold with just the adhesive film on the outside. The protective release paper may be comprised of paper or plastic wrapping, such as cellophane.

The adhesive film may be a two-sided adhesive, in which an inside surface attaches to the accessory item, and the outside surface attaches to a decorative layer. Alternatively, the adhesive film may be nailed or screwed into the accessory item, and the outside surface includes an adhesive to secure to a decorative layer. Furthermore, instead of an adhesive film layer, the adhesive layer may be glue directly applied to the accessory item's surface.

The pre-made accessory item may be mass-produced so that users can purchase an accessory item for their home or project, which can then be molded to have a decorative layer that matches the surrounding flooring. This way, the user is not restricted to a relatively poor "look-alike" decorative layer but can use leftover planks from their actual flooring, remove the decorative layer, and attach that decorative layer to the customizable accessory item.

Some transitions and profiles currently extruded and marketed are made of rigid extruded plastics. These materials are known to split or crush under normal use over time. This is because the materials flex up and down constantly under the pressure of constant foot traffic or rolling loads such as wheelchairs or pallets jacks.

In some implementations, the adhesive film may be designed to increase the structural strength and integrity of the accessory item's profile, providing reinforced strength 1005 to the accessory item 905. This reinforced strength may be achieved, for example, by wrapping the adhesive film around the flooring transition beginning from the underside, then over the top surface, and then back down around the underside forming an encapsulation of the majority of the surface area of the profile. The adhesive film may possess greater strength by being constructed of a fiber scrim or mesh carrier, a sheet, foil, or woven fiber carrier, or the adhesive itself is rigid or high enough tensile strength not to tear or shred under stress easily.

Regarding PVC (polyvinyl chloride) or plastic transitions, the outer dry adhesive film may be constructed chemically or structurally to prevent plasticizer migration from the profile and the decorative surface to be wrapped around the transition or profile. Additionally, the outer dry adhesive film is designed to prevent the common problem found in PVC flooring materials which is shrinkage over time. This ensures that any seams will not open up over time. Seams may be implemented when a transition or profile is longer than the multilayer plank or tile from which the decorative wear layer is delaminated. Additionally, the dry adhesive film layer is designed so it cannot experience adhesive displacement under traffic conditions or develop visible ruts that telegraph visually to the surface of the decorative wear layer.

The protective release paper protects the adhesive film from collecting dirt or other contaminants and protects it from physical damage during packaging and shipping. Additionally, the protective release paper, which is substantially the same width as the adhesive film, can have template markings 1010 that serves as a cutting template for the decorative surface layer. The release paper may include markings that, once the release paper is removed, the user can rely on those markings to measure how much decorative layer they should remove from a plank. For example, the release paper may include an additional and distinct layer (such as paper), so the user can quickly identify the different use of the release paper. Alternatively or additionally, the release paper may include ink markings, such as a rectangular box that extends along its body which can be used as the template.

The user removes the release paper from the adhesive film wrapped transition or profile, then temporarily tapes it, using painter's tape, to the decorative surface of multilayered flooring material. The user then uses the release paper as a cutting guide or pattern while cutting around the shape of the release paper. This ensures that the user cuts the required width and length needed to wrap around the accessory item or profile. Additionally, this release paper pattern ensures precise cuts when dealing with more intricate items such as floor vents, floor outlet covers, etc.

FIG. 11 shows an illustrative representation in which an accessory item is used. If present, the protective release paper 915 may have been removed from the accessory item 905. The user attaches the decorative surface layer 620 to the adhesive film 910 on the accessory item. The decorative layer may have been obtained, for example, by removing the decorative layer from a plank, as shown in FIGS. 6-8.

Figure 12:
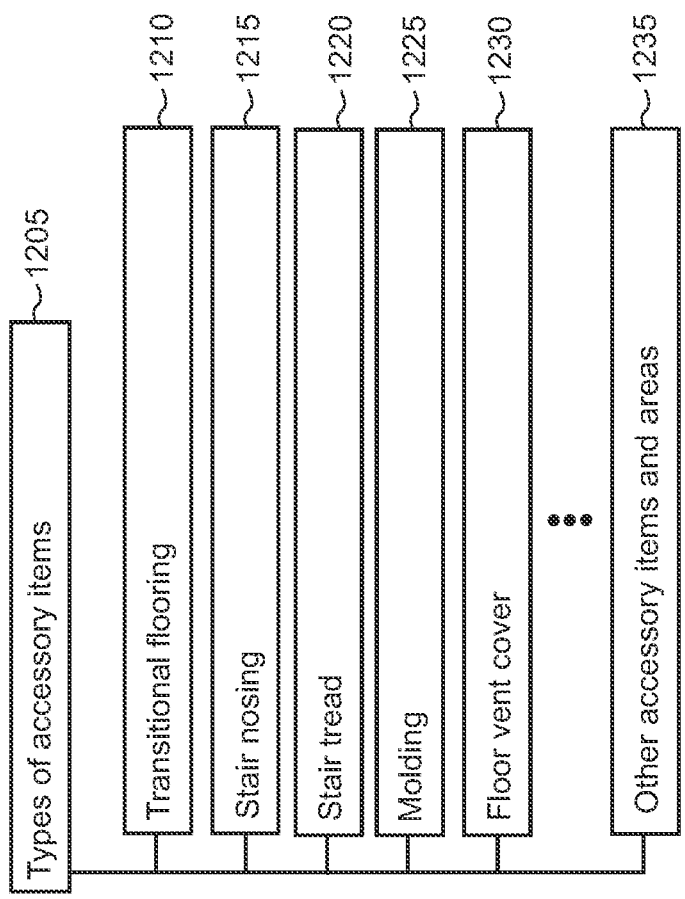
FIG. 12 shows a schema of accessory items that may utilize features of the instant disclosure.

FIG. 12 shows an illustrative schema of various types of accessory items that can be customized and used as shown, for example, in FIGS. 10 and 11, as representatively shown by numeral 1205. Exemplary types of accessory items include transitional flooring 1210, stair nosing 1215, stair tread 1220, molding 1225, floor vent cover 1230, and other accessory items and areas 1235.

Figure 13:
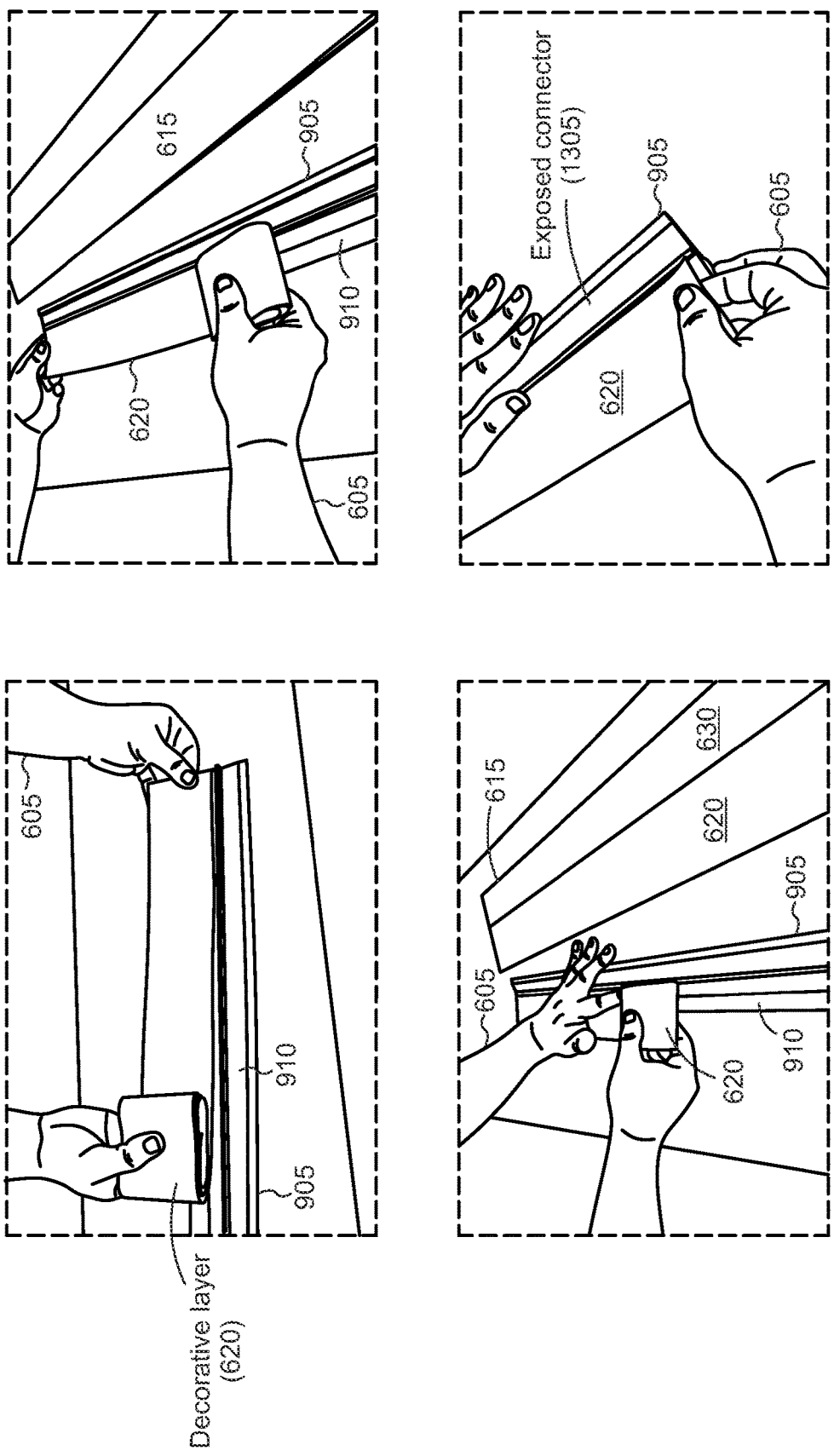
FIG. 13 shows illustrative representations of the decorative layer applied to the adhesive film around the accessory item.

FIG. 13 shows an illustrative representation in which the user applies the decorative surface layer 620 to the accessory item, which is a transitional flooring piece 905 in this example. The adhesive film layer 910 is already attached to the transitional flooring. The user may have applied the adhesive film (FIG. 9), or the user may have purchased a pre-made customizable transitional flooring piece (FIG. 10). The user takes the decorative layer and applies it around the transitional flooring's exposed and relevant surface areas. The user may apply the decorative layer across most of the transitional flooring's surface area, except for the exposed connector 1305 that attaches to the floor.

Various illustrative embodiments are disclosed herein. In one exemplary embodiment, a removal tool is configured to remove a decorative layer from a plank, comprising: a removal shaft having a fastening mechanism on one end and a slit that extends perpendicular to a longitudinal axis of the removal shaft, wherein the slit extends perpendicularly from end-to-end; and a driver that attaches to the removal shaft's fastening mechanism, in which manipulation at the driver translates to a corresponding manipulation at the removal shaft.

In another example, further comprising a bevel on at least one side of the slit. As another example, the driver is a linear shaft that, when attached to the removal shaft, is oriented substantially perpendicular to the removal shaft. As a further example, the removal shaft's fastening mechanism is a threaded male connector, and the linear shaft includes a threaded bore that connects to the threaded male connector. As a further example, the threaded bore is substantially centered on the linear shaft. In another example, the linear shaft is substantially cylindrical. As a further example, the threaded bore fully extends from end to end to establish a hole in the linear shaft. In another example, a length of the threaded bore is same as a length of the threaded male connector on the removal shaft. As a further example, the driver is a drill attachment that is partially insertable into a drill's chuck. As another example, the drill attachment includes a bore that, when connected to the removal shaft's fastening mechanism, is oriented parallel to the removal shaft. As another example, the removal shaft's fastening mechanism is a threaded male connector, and the linear shaft includes a threaded bore that connects to the threaded male connector. In another example, on an end opposite the threaded bore is a drill bit that extends in a like direction as the bore. In another example, a length of the threaded bore is same as a length of the threaded male connector on the removal shaft. As another example, the fastening mechanism is one or more of a tab and notch, press-fit, threads, screw, or bolt. As another example, the slit begins at an end opposite the fastening mechanism. As a further example, the slit extends across more than 50% of the removal shaft's length.

In another exemplary embodiment is a removal tool configured to remove a decorative layer from a plank, comprising: a removal shaft having a fastening mechanism on one end and a slit that extends perpendicular to a longitudinal axis of the removal shaft; and a driver that attaches to the removal shaft's fastening mechanism, in which manipulation at the driver translates to a corresponding manipulation at the removal shaft. As another example, the slit fully extends perpendicularly from end-to-end. As another example, the driver is a cylindrical handle or a drill attachment, in which each driver includes a threaded bore that connects to the fastening mechanism on the removal shaft. In another example, the slit begins at an end opposite the fastening mechanism.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A removal tool configured to remove a decorative layer from a plank, comprising:
   a removal shaft having a threaded male connector on one end and a slit that extends parallel to a longitudinal axis of the removal shaft, wherein the slit begins at an end opposite a fastening mechanism and ends before reaching an opposite end thereof and before reaching the fastening mechanism; and
   a driver that forms a cylindrical linear shaft and that is oriented perpendicularly to the removal shaft, the driver has a substantially centered threaded bore that attaches to the removal shaft's threaded male connector, in which manipulation at the driver translates to a corresponding manipulation at the removal shaft, and wherein the threaded bore fully extends from end to end to establish a hole therein and thereby make the driver reversible, end to end being perpendicular to a longitudinal axis on the linear shaft,
   wherein the driver has sufficient surface area on opposite sides of the threaded bore to enable a user to grip the driver to create the translated manipulation at the removal shaft, and
   wherein the threaded bore includes a bevel on each end thereof.

2. The removal tool of claim 1, further comprising a bevel on at least one side of the slit.

3. The removal tool of claim 1, wherein a length of the threaded bore is same as a length of the threaded male connector on the removal shaft.

4. The removal tool of claim 1, wherein the fastening mechanism is one or more of a tab and notch, press-fit, threads, screw, or bolt.

5. The removal tool of claim 1, wherein the slit extends across more than 50% of the removal shaft's length.

6. A removal tool configured to remove a decorative layer from a plank, comprising:
   a removal shaft having a fastening mechanism on one end and a slit that extends parallel to a longitudinal axis of the removal shaft, wherein a bevel is on at least one side of the slit; and
   a driver that attaches to the removal shaft's fastening mechanism, in which manipulation at the driver translates to a corresponding manipulation at the removal shaft,
   wherein the driver is a cylindrical linear shaft and that is oriented perpendicularly to the removal shaft,
   wherein the threaded bore fully extends from end to end to establish a hole therein and thereby make the driver reversible, end to end being perpendicular to the longitudinal axis on the linear shaft, and
   and wherein the threaded bore fully extends from end to end to establish a hole therein and thereby make the driver reversible, end to end being perpendicular to a longitudinal axis on the linear shaft.

7. The removal tool of claim 6, wherein the slit fully extends parallel from end-to-end.

8. The removal tool of claim 6, wherein the slit begins at an end opposite the fastening mechanism.

\* \* \* \* \*